United States Patent

Heisey et al.

(10) Patent No.: US 8,876,208 B2
(45) Date of Patent: Nov. 4, 2014

(54) CHILD RESTRAINT SYSTEM

(75) Inventors: Nathan W. Heisey, Seymour, IN (US); Rob Englert, Jamesville, NY (US); Trevor S. Brown, Salem, IN (US)

(73) Assignee: Cosco Management, Inc., Wilmington, DE (US)

( * ) Notice: Subject to any disclaimer, the term of this patent is extended or adjusted under 35 U.S.C. 154(b) by 136 days.

(21) Appl. No.: 13/448,151

(22) Filed: Apr. 16, 2012

(65) Prior Publication Data

US 2012/0261961 A1    Oct. 18, 2012

(51) Int. Cl.
*B60N 2/28* (2006.01)
*B62B 7/14* (2006.01)
*B62B 7/00* (2006.01)

(52) U.S. Cl.
CPC ........... *B62B 7/142* (2013.01); *B62B 7/006* (2013.01); *B60N 2/2863* (2013.01); *B60N 2/2851* (2013.01); *B60N 2/2845* (2013.01); *B60N 2/2848* (2013.01); *B60N 2/2827* (2013.01); *B62B 7/145* (2013.01)
USPC ...................................... 297/256.16; 297/130

(58) Field of Classification Search
USPC .............. 297/130, 256.16, 250.1; 280/33.993
See application file for complete search history.

(56) References Cited

U.S. PATENT DOCUMENTS

| | | | |
|---|---|---|---|
| 4,743,063 A * | 5/1988 | Foster, Jr. ........................ | 297/130 |
| 4,750,783 A | 6/1988 | Irby et al. | |
| 5,385,387 A | 1/1995 | Kain | |
| 5,478,135 A | 12/1995 | Kain | |
| 5,586,351 A | 12/1996 | Ive | |
| 5,772,279 A * | 6/1998 | Johnson, Jr. .................. | 297/130 |
| 5,997,098 A | 12/1999 | Coffeen | |
| 6,017,088 A | 1/2000 | Stephens et al. | |
| 6,170,911 B1 | 1/2001 | Kassai et al. | |
| 6,299,249 B1 | 10/2001 | Mori | |
| 6,331,032 B1 * | 12/2001 | Haut et al. ..................... | 297/130 |
| 6,336,682 B1 | 1/2002 | Rosko | |
| 6,347,832 B2 | 2/2002 | Mori | |
| 6,428,099 B1 | 8/2002 | Kain | |
| 6,428,100 B1 | 8/2002 | Kain et al. | |
| 6,443,522 B1 | 9/2002 | Kain et al. | |
| 6,554,358 B2 | 4/2003 | Kain | |
| 6,695,400 B2 * | 2/2004 | Washizuka et al. ........... | 297/130 |
| 6,705,676 B1 | 3/2004 | Berringer et al. | |
| 6,715,828 B1 * | 4/2004 | Cheng ........................ | 297/183.3 |
| 6,793,280 B2 * | 9/2004 | Washizuka et al. ........... | 297/130 |
| 6,863,286 B2 * | 3/2005 | Eros et al. .................. | 280/47.38 |
| 6,921,359 B2 | 7/2005 | Haws | |
| 6,979,057 B2 | 12/2005 | Sedlack | |
| 7,040,694 B2 * | 5/2006 | Sedlack ........................ | 297/130 |
| 7,090,294 B2 | 8/2006 | Balensiefer, II et al. | |
| 7,320,500 B2 * | 1/2008 | Mascull .................... | 297/256.16 |
| 2009/0066130 A1 | 3/2009 | Shafer et al. | |
| 2009/0295207 A1 | 12/2009 | Zink et al. | |
| 2010/0207436 A1 * | 8/2010 | Karremans et al. ...... | 297/256.16 |

* cited by examiner

*Primary Examiner* — David R Dunn
*Assistant Examiner* — Tania Abraham
(74) *Attorney, Agent, or Firm* — Barnes & Thornburg LLP

(57) ABSTRACT

A child restraint system includes an infant carrier and a base adapted to be mounted on a passenger seat in a vehicle in a vehicle mode. The infant carrier is also configured to be mounted on a stroller frame in a stroller mode. The infant carrier includes a seat shell and a carrying handle coupled to the seat shell.

34 Claims, 6 Drawing Sheets

CHILD RESTRAINT SYSTEM

PRIORITY CLAIM

This application claims priority to Chinese Utility Model Application No. 201120125376.7, filed Apr. 15, 2011, which application is hereby incorporated in its entirety herein.

BACKGROUND

The present disclosure relates to child restraints and, in particular, to an infant carrier that may be mounted on an underlying base held in place on a passenger seat of a vehicle. More particularly, the present disclosure relates to a system for anchoring an infant carrier to an underlying base in one mode and to a stroller frame in another mode.

SUMMARY

According to the present disclosure, a child restraint system includes an infant carrier, a base, and a stroller frame. The infant carrier may mate with either the base or the stroller frame. The child restraint system is in a vehicle mode when the infant carrier is mounted on the base and the base is coupled to a vehicle seat in a vehicle. The child restraint system is in a stroller mode when the infant carrier is mounted on the stroller frame.

In illustrative embodiments, the infant carrier includes a seat shell, a front shell anchor, and a rear shell anchor. The seat shell may be mounted on either the base or the stroller frame. The front shell anchor is coupled to the seat shell to move about a first pivot axis relative to the seat shell between a base-retaining position and a base-releasing position. The rear shell anchor is spaced apart from the front shell anchor and coupled to the seat shell to move about a second pivot axis relative to the seat shell between a stroller-retaining position and stroller-releasing position.

In illustrative embodiments, the front shell anchor interconnects the seat shell and the base when the infant carrier is mounted on the base and the front shell anchor is the base-retaining position. The rear shell anchor interconnects the seat shell and the stroller frame when the infant carrier is mounted on the stroller frame and the rear shell anchor is in the stroller-retaining position.

In illustrative embodiments, the child restraint system further includes an anchor controller coupled to the seat shell to move relative to the seat shell. The anchor controller is configured to provide means for moving the front shell anchor from the base-retaining position to the base-releasing position and the rear shell anchor from the stroller-retaining position to the stroller-releasing position in response to an actuation force so that the infant carrier is freed to move away from the base or the stroller.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
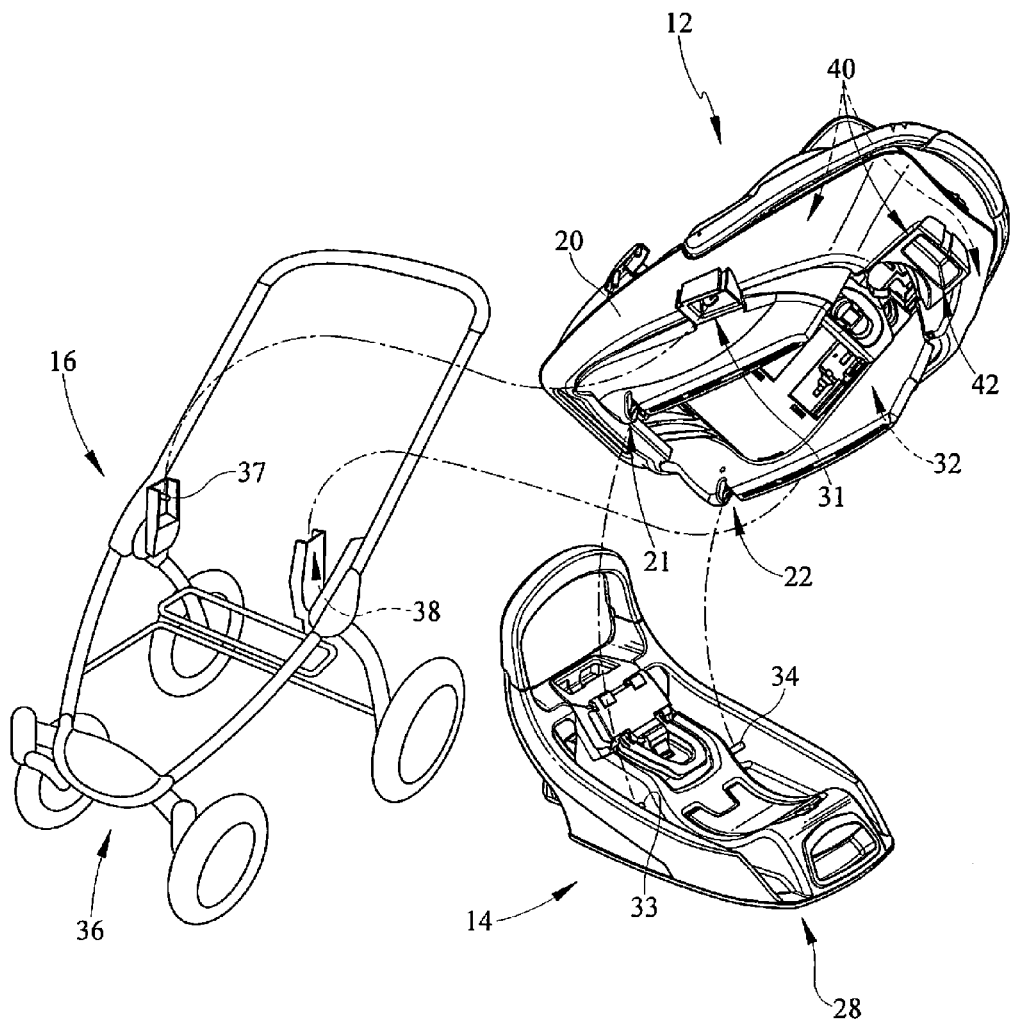
FIG. 1 is a perspective view of a child restraint system showing that the child restraint system includes an infant carrier, a base coupled to a vehicle seat, and a stroller frame and suggesting that the infant carrier may be mounted with both the base and the stroller frame.
Figure 2:
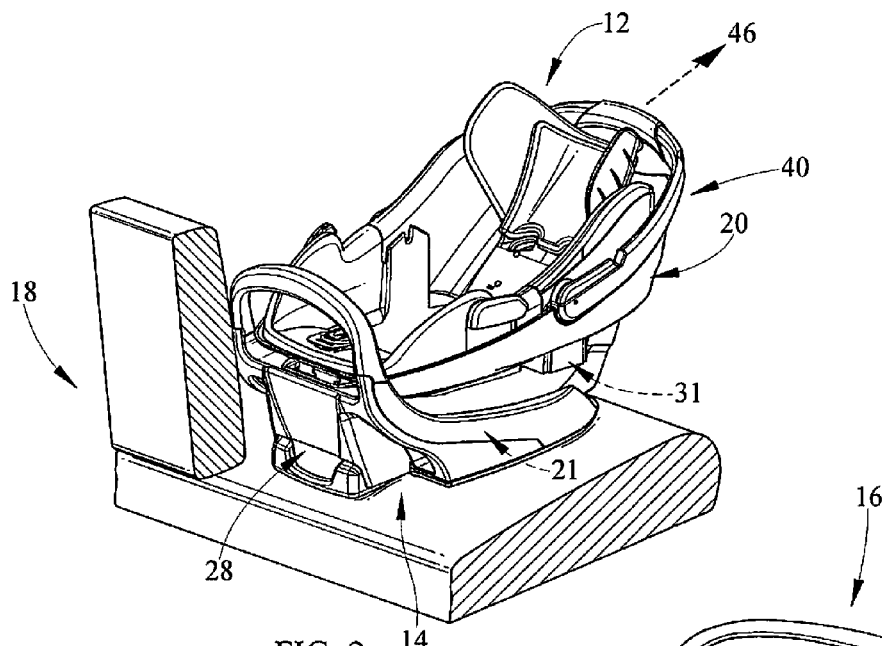
FIG. 2 is a perspective view of the child restraint system configured in a vehicle mode showing that the infant carrier is mounted to the base and the base is coupled to the vehicle seat.
Figure 3:
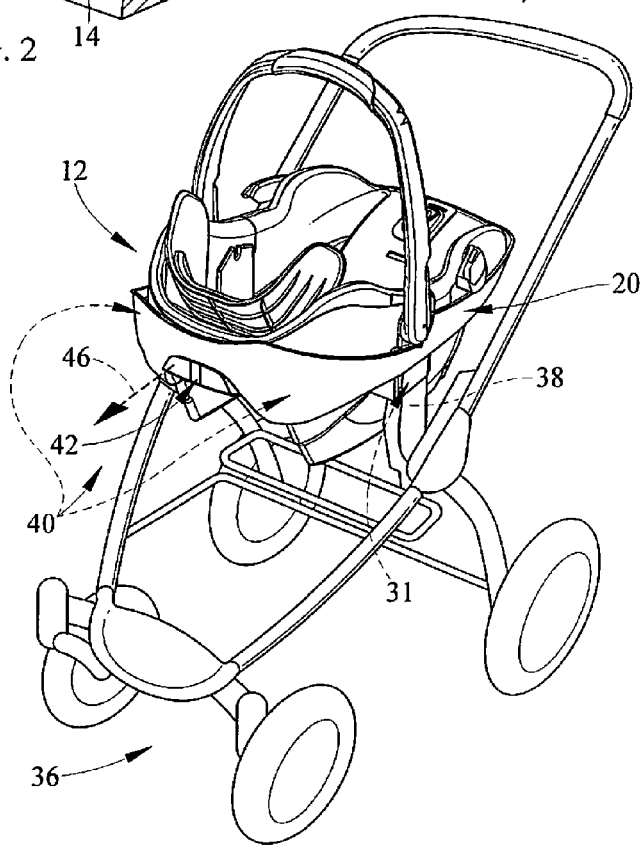
FIG. 3 is a perspective view of the child restraint system reconfigured in a stroller mode showing the infant carrier mounted on the stroller frame.

Child restraint system 10 includes an infant carrier 12, a base 14, and a stroller frame 16 as shown in FIGS. 1-3. Infant carrier 12 may be configured to mate with either base 14 or stroller frame 16 as suggested in FIG. 1. In a vehicle mode, infant carrier 12 mounts on base 14 which is held in place on a passenger seat 18 in a vehicle using any suitable means as shown, for example, in FIG. 2. In a stroller mode, infant carrier 12 mounts on stroller frame 16 as shown, for example, in FIG. 3.

Figure 4:
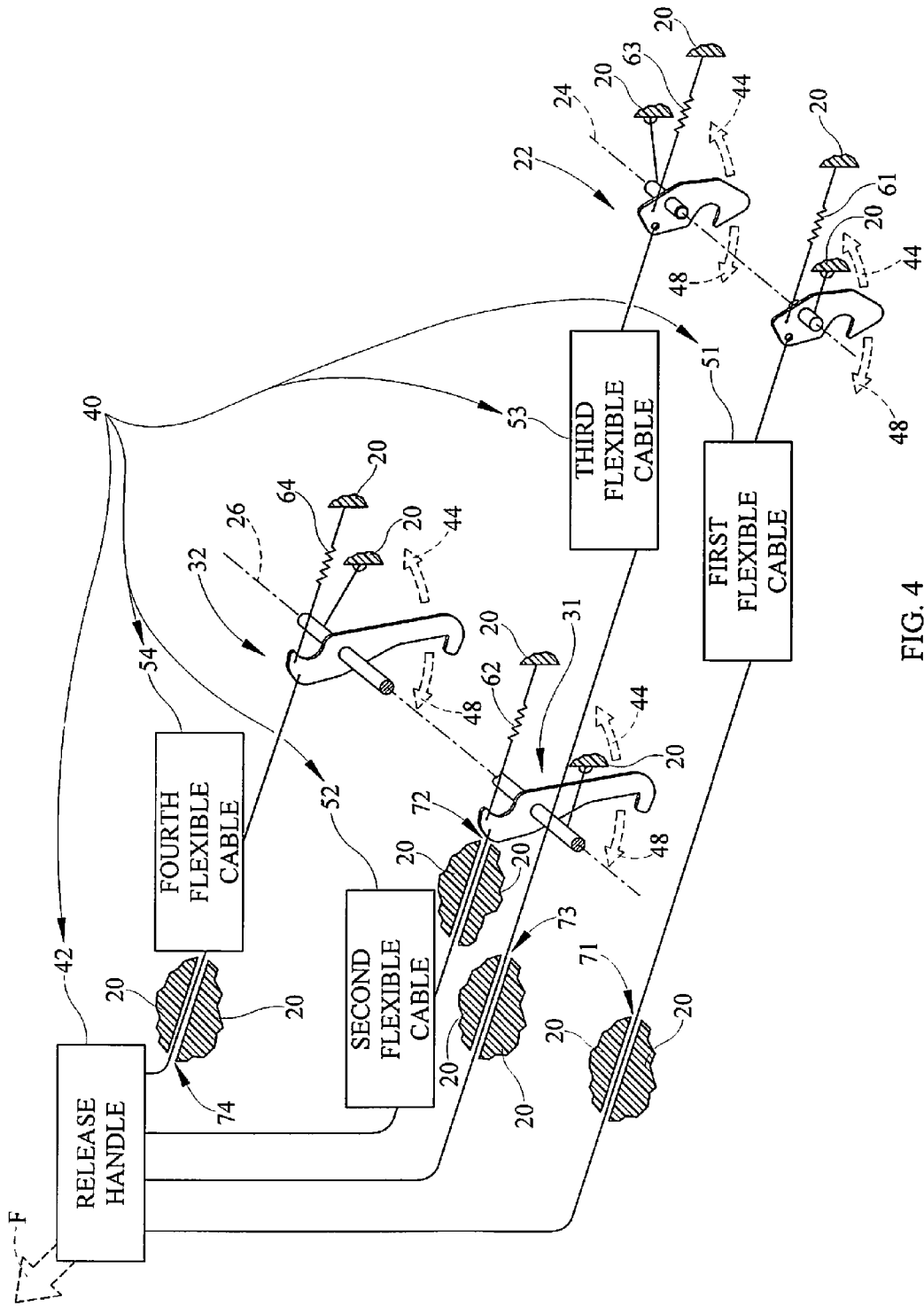
FIG. 4 is a diagrammatic view of an anchor system included in the infant carrier of FIGS. 1-3 showing that the anchor carrier includes two front shell anchors, two rear shell anchors and an anchor controller including a release handle and four flexible cables interconnecting the release handle and the shell anchors.
Figure 5:
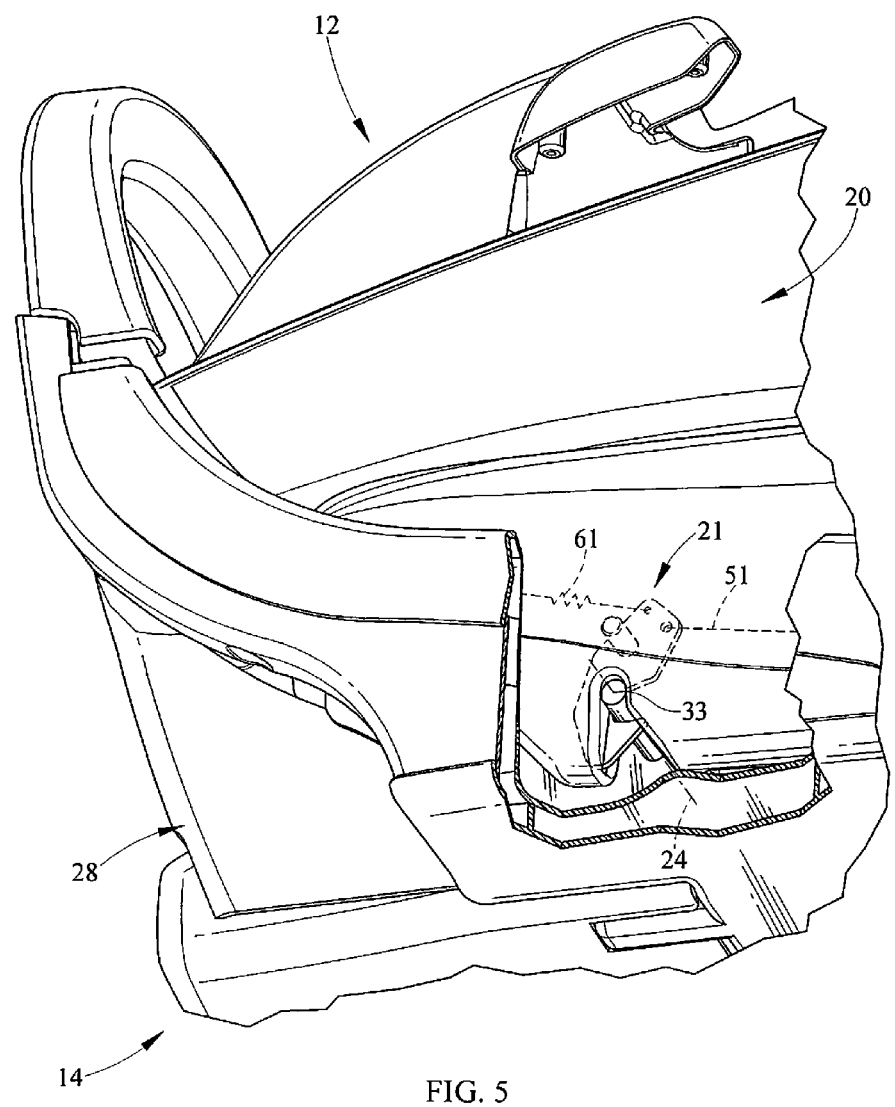
FIG. 5 is a partial perspective view of the infant carrier mated with the base with portions broken away to reveal one of the front shell anchors included in the infant carrier coupled to an associated base-anchor retainer included in the base.
Figure 6:
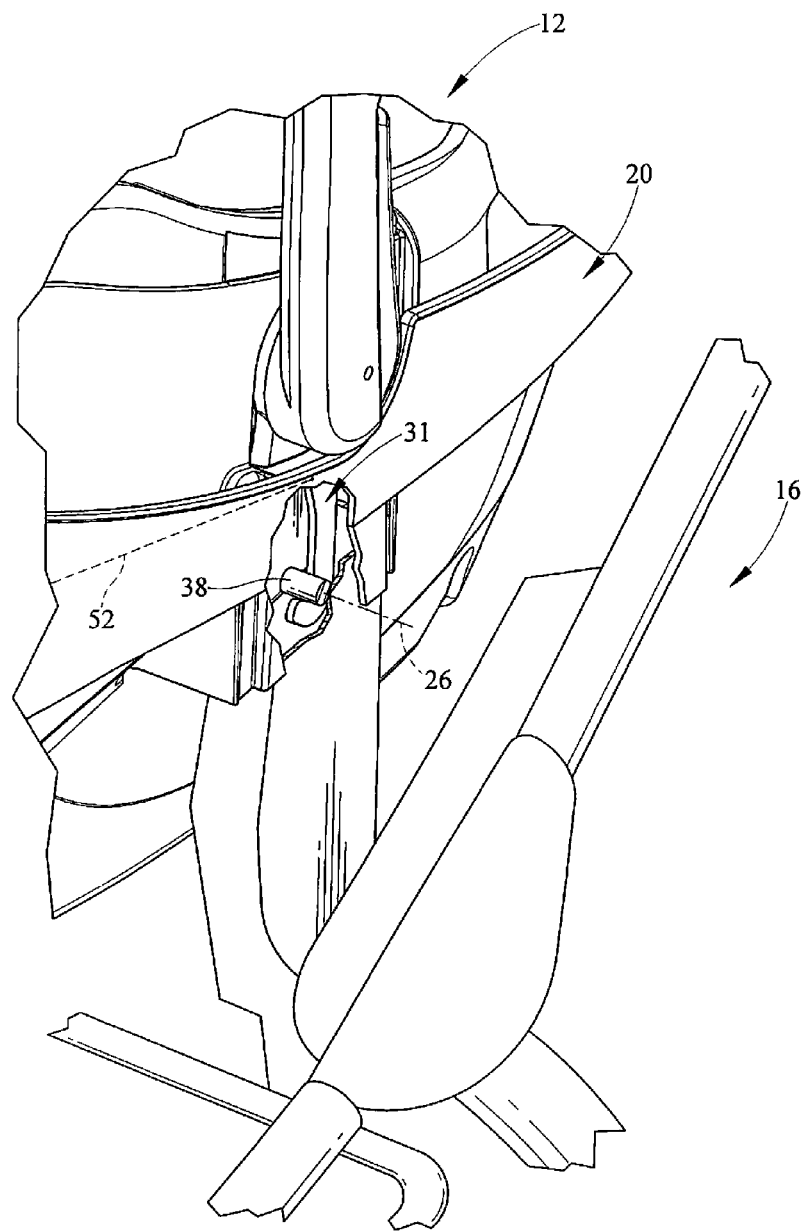
FIG. 6 is a partial perspective view of the infant carrier mated with the stroller with portions broken away to reveal one of the rear shell anchors included in the infant carrier coupled to an associated stroller-anchor retainer included in the stroller.

Infant carrier 12 includes a seat shell 20, two front shell anchors 21, 22, two rear shell anchors 31, 32, and an anchor controller 40 as shown in FIG. 4. Front shell anchors 21, 22 are coupled to seat shell 20 to move between a base-retaining position that couples seat shell 20 to base 14 and a base-releasing position. Rear shell anchors 31, 32 are coupled to seat shell 20 to move between a stroller-retaining position in which seat shell 20 is coupled to stroller frame 16 and a stroller-releasing position. Anchor controller 40 is configured to provide means for moving both front shell anchors 21, 22 and rear shell anchors 31, 32 at the same time with one actuation force so that seat shell 20 is free to be separated from either base 14 or stroller frame 16 as suggested in FIG. 4.

Front shell anchors 21, 22 are coupled to seat shell 20 for pivotable movement about a first pivot axis 24 that extends laterally across seat shell 20. Front shell anchors 21, 22 move between the base-retaining position and the base-releasing position in response to use of anchor controller 40 by a caregiver. Front shell anchors 21, 22 are used to couple seat shell 20 to base 14 as shown, for example, in FIG. 2.

Base 14 includes a foundation 28 and a pair of base-anchor retainers 33, 34. Foundation 28 is adapted to set on passenger seat 18 in a vehicle. Base-anchor retainers 33, 34 are coupled to foundation 28 in a fixed position and are configured to mate with front shell anchors 21, 22 when seat shell 20 is mounted on base 14 and front shell anchors 21, 22 are in the base-retaining position.

Rear shell anchors 31, 32 are coupled to seat shell 20 to lie in spaced-apart relation to front shell anchor 21, 22 and are configured to pivot about a second pivot axis 26 that extends laterally across seat shell 20. Rear shell anchors 31, 32 move between the stroller-retaining position and the stroller-releasing position. Rear shell anchors 31, 32 are used to couple seat shell 20 to stroller frame 16 as shown in FIG. 3.

Stroller frame 16 includes a rolling base 36 and a pair of stroller-anchor retainers 37, 38 as illustrated in FIG. 3. Rolling base 36 is adapted to roll on ground underlying rolling base 36. Stroller-anchor retainers 37, 38 are coupled to rolling base 36 in a fixed position relative to rolling base 36 and are configured to mate with rear shell anchors 31, 32 when seat shell 20 is mounted on stroller frame 16 and rear shell anchors 31, 32 are in the base-retaining position.

Figure 7:
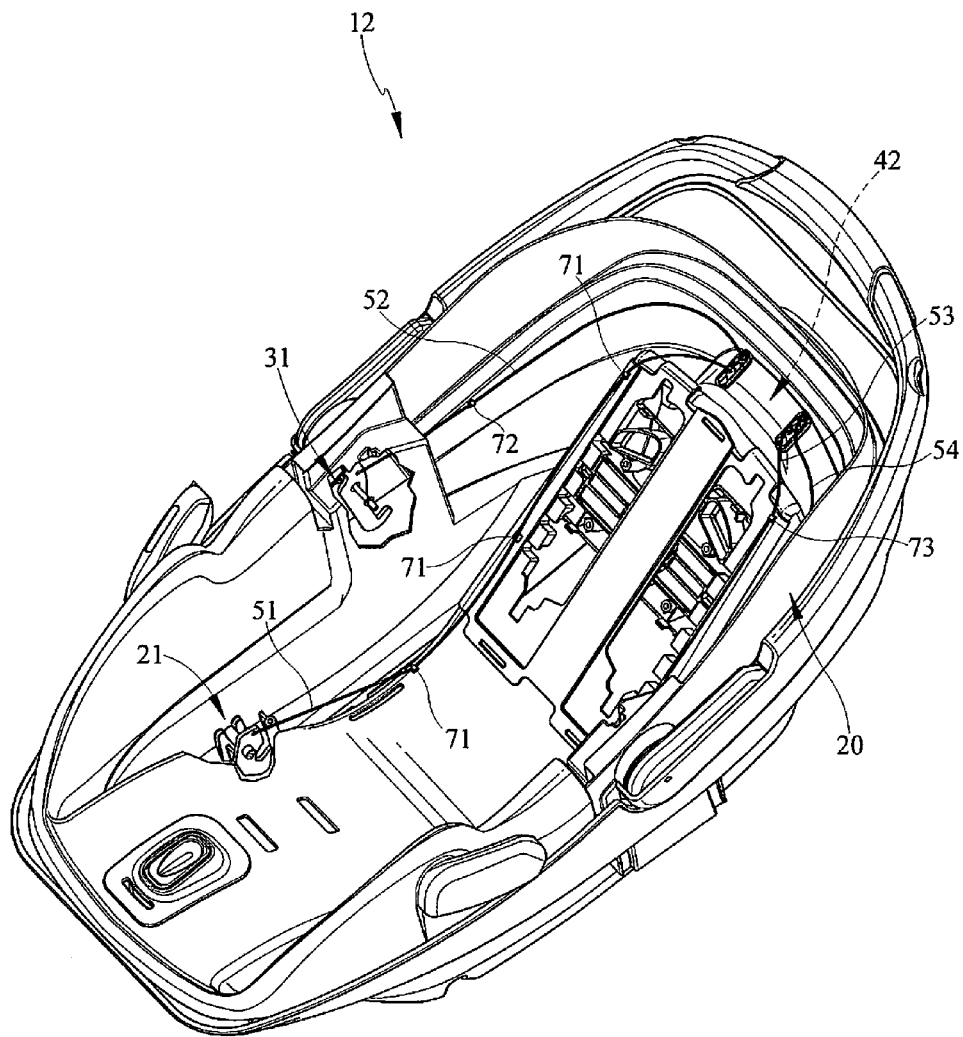
FIG. 7 is a perspective view of the infant carrier of FIG. 1 with portions broken away to reveal one of the front and rear shell anchors.

Movement of front and rear shell anchors 21, 22, 31, 32 is controlled by anchor controller 40 as suggested in FIG. 4. Anchor controller 40 includes a release handle 42 and four cables 51, 52, 53, 54 as shown diagrammatically in FIG. 4 and illustratively in FIG. 7. Release handle 42 is coupled to seat shell 20 to move back and forth relative to seat shell 20 between a locked position and an unlocked position. First cable 51 is arranged to interconnect release handle 42 and first front shell anchor 21 to cause front shell anchor 21 to pivot about first pivot axis 24 in a counter-clockwise direction 44 from the base-retaining position to the base-releasing position in response to movement of release handle 42 in a rearward direction 46 away from seat shell 20. Second cable 52 is arranged to interconnect release handle 42 and rear shell anchor 31 to cause rear shell anchor 31 to pivot about second pivot axis 26 in counter-clockwise direction 44 from the stroller-retaining position to the stroller-releasing position in response to movement of release handle 42 in rearward direction 46.

Second front shell anchor 22 is spaced-apart laterally from first front shell anchor 21 as shown in FIG. 1. Third cable 53 is arranged to interconnect release handle 42 and second front shell anchor 22 to cause second front shell anchor 22 to pivot about first pivot axis 24 in counter-clockwise direction 44 from the base-retaining position to the base-releasing position in response to movement of release handle 42 in rearward direction 46 away from seat shell 20. Second rear shell anchor 32 is spaced-apart laterally from first rear shell anchor 31. Fourth cable 54 is arranged to interconnect release handle 42 and second rear shell anchor 32 to cause second rear shell anchor 32 to pivot about second pivot axis 26 in counter-clockwise direction 44 from the stroller-retaining position to the stroller-releasing position in response to movement of release handle 42 in rearward direction 46.

A caregiver (not shown) applies an actuation force F to release handle 42 to move release handle 42 from the locked position to the unlocked position as suggested in FIG. 4. Actuation force F is sufficient to overcome a set of bias springs 61, 62, 63, and 64 included in anchor controller 40 as shown in FIG. 4. First bias spring 61 interconnects seat shell 20 and first front shell anchor 21 to cause first front shell anchor 21 to be biased to move in a clockwise direction 48 about first pivot axis 24 to assume the base-retaining position. Second bias spring 62 interconnects seat shell 20 and first rear shell anchor 31 to cause first rear shell anchor 31 to be biased to move in clockwise direction 48 about second pivot axis 26 to assume and remain in the stroller-retaining position.

Third bias spring 63 interconnects seat shell 20 and second front shell anchor 22 to cause second front shell anchor 22 to be biased to move in clockwise direction 48 about first pivot axis 24 to assume the base-retaining position. Fourth bias spring 64 interconnects seat shell 20 and second rear shell anchor 32 to cause second rear shell anchor 32 to be biased to move in clockwise direction 48 about second pivot axis 26 to assume and remain in the stroller-retaining position.

Cables 51, 52, 53, and 54 are configured to only transmit actuation force F in tension. Cables 51, 52, 53, and 54 are configured so as not to transmit any compressive forces. As a result, cables 51, 52, 53, and 54 deform when compressive forces are applied. Cable 51 is routed through a first cable passageway 71 formed in seat shell 20. Cable 52 is routed through a second cable passageway 72 formed in seat shell 20. Cable 53 is routed through a third cable passageway 73 formed in seat shell 20. Cable 54 is routed through a fourth cable passageway 74 formed in seat shell 20.

In another embodiment, release handle 42 may be coupled to front and rear shell anchors 21, 22, 31, 32 by using four cables. As an example, a first cable interconnects release handle 42 and first rear shell anchor 31. A second cable interconnects first rear shell anchor 31 and first front shell anchor 21 so that actuation of release handle 42 causes serial movement of release handle 42, first cable, first rear shell anchor 31, second cable, and first front shell anchor 21. A third cable interconnects release handle 42 and second rear shell anchor 32. A fourth cable interconnects second rear shell anchor 32 and second front shell anchor 22 so that actuation of release handle 42 causes serial movement of release handle 42, third cable, second rear shell anchor 32, fourth cable, and second front shell anchor 22.

Child restraint system 10 comprises base 14, infant carrier 12, anchor controller 40 as shown in FIG. 4. Base 14 includes foundation 28 adapted to set on passenger seat 18 and base-anchor retainer 33 coupled to foundation 28 in the fixed position relative to foundation 28.

Infant carrier 12 includes seat shell 20, front shell anchor 21, and rear shell anchor 31. Seat shell 20 is mounted on base 14. Front shell anchor 21 is coupled to seat shell 20 to move about first pivot axis 24 relative to seat shell 20 between the base-retaining position in which front shell anchor 21 interconnects seat shell 20 to base-anchor retainer 33 and the base-releasing position in which front shell anchor 21 is spaced apart from base-anchor retainer 33. Rear shell anchor 31 is spaced apart from front shell anchor 21 and is coupled to seat shell 20 to move about second pivot axis 26 relative to seat shell 20 between a stroller-retaining position and stroller-releasing position.

Anchor controller 40 is configured to provide means for moving front shell anchor 21 from the base-retaining position to the base-releasing position and rear shell anchor 31 from the stroller-retaining position to the stroller-releasing position in response to an actuation force F. As a result, infant carrier 12 is freed to move away from base 14.

Anchor controller 40 is coupled to seat shell 20 to move back and forth relative to seat shell 20 between a locked position and an unlocked position. Anchor controller 40 is in a locked position when front shell anchor 21 is in the base-retaining position and rear shell anchor 31 is in the stroller-retaining position. Anchor controller 40 is in the unlocked position when front shell anchor 21 is in the base-releasing position and rear shell anchor 31 is in the stroller-releasing position.

Anchor controller 40, for example, includes release handle 42, first cable 51, and second cable 52 as shown in FIG. 4. First cable 51 is arranged to interconnect release handle 42 and front shell anchor 21 to cause front shell anchor 21 to pivot about first pivot axis 24 in counter-clockwise direction 44 from the base-retaining position to the base-releasing position in response to movement of release handle 42 in rearward direction 46 away from seat shell 20. Second cable 52 is arranged to interconnect release handle 42 and rear shell anchor 31 to cause rear shell anchor 31 to pivot about second pivot axis 26 in counter-clockwise direction 44 from the stroller-retaining position to the stroller-releasing position in response to movement of release handle 42 in rearward direction 46.

Child restraint system 10 further includes stroller frame 16 as shown in FIG. 1. Stroller frame 16 includes rolling base 36 and stroller-anchor retainer 37 coupled to rolling base 36 in a fixed position relative to rolling base 36. Rear shell anchor 31 interconnects seat shell 20 and stroller-anchor retainer 37 when rear shell anchor 31 is in the stroller-retaining position.

Front shell anchor 21 is spaced-apart longitudinally from rear shell anchor 31. Rear shell anchor 31 is located between front shell anchor 21 and release handle 42. First pivot axis 24 is spaced apart from and generally parallel to second pivot axis 26.

Anchor controller 40 further includes first and second bias springs 61, 62 as shown in FIG. 4. First bias spring 61 is arranged to interconnect seat shell 20 and front shell anchor 21 to cause front shell anchor 21 to be biased to move in clockwise direction 48 about first pivot axis 24 to assume the base-retaining position.

Second bias spring 62 is arranged to interconnect seat shell 20 and rear shell anchor 31 to cause rear shell anchor 31 to be biased to move in clockwise direction 48 about second pivot axis 26 to assume the stroller-retaining position.

Actuation force F is applied to release handle 42 to cause release handle 42 to move in rearward direction 46 away from seat shell 20 to overcome a first bias force provided by first bias spring 61. First cable 51 is pulled into tension to transmit actuation force F applied to release handle 42 to front shell anchor 21. Second cable 52 is pulled into tension to transmit actuation force F applied to release handle 42 to rear shell anchor 31. As an example, first and the second cables 51, 52 do not transmit force when compressed.

First cable 51 is arranged to extend through a first cable passageway 71 formed in seat shell 20 as shown in FIG. 4. Second cable 52 is arranged to extend through a second cable passageway 72 formed in seat shell 20.

Infant carrier 12 includes seat shell 20, first and second front shell anchors 21, 22, and first and second rear shell anchors 31, 32. First and second front shell anchors 21, 22 are coupled to seat shell 20 to move about first pivot axis 24 relative to seat shell 20 between the base-retaining position and the base-releasing position. Rear shell anchors 31, 32 are spaced apart from front shell anchors 21, 22 and are coupled to seat shell 20 to move about second pivot axis 26 relative to seat shell 20 between a stroller-retaining position and stroller-releasing position.

Anchor controller 40 is coupled to seat shell 20 to move back and forth relative to seat shell 20 between the locked position the unlocked position. Anchor controller 40 includes a release handle 42 and first, second, third, and fourth cables 51, 52, 53, 54. First cable 51 interconnects release handle 42 and first front shell anchor 21 to cause first front shell anchor 21 to pivot about first pivot axis 24 in counter-clockwise direction 44 from the base-retaining position to the base-releasing position in response to movement of release handle 42 in rearward direction 46 away from seat shell 20. Second cable 52 interconnects release handle 42 and first rear shell anchor 31 to cause first rear shell anchor 31 to pivot about second pivot axis 26 in counter-clockwise direction 44 from the stroller-retaining position to the stroller-releasing position in response to movement of release handle 42 in rearward direction 46.

Third cable 53 is arranged to interconnect release handle 42 and second front shell anchor 22 to cause second front shell anchor 22 to pivot about first pivot axis 24 in counter-clockwise direction 44 from the base-retaining position to the base-releasing position in response to movement of release handle 42 in rearward direction 46. Fourth cable 54 is arranged to interconnect release handle 42 and second rear shell anchor 32 to cause second rear anchor 32 to pivot about second pivot axis 26 in counter-clockwise direction 44 from the stroller-retaining position to the stroller-releasing position in response to movement of release handle 42 in rearward direction 46.

Anchor controller 40 further includes first and second bias springs 61, 62. First bias spring 61 is arranged to interconnect seat shell 20 and first front shell anchor 21 to cause first front shell anchor 21 to be biased to move in clockwise direction 48 about first pivot axis 24 to assume the base-retaining position. Second bias spring 62 is arranged to interconnect seat shell 20 and first rear shell anchor 31 to cause first rear shell anchor 31 to be biased to move in clockwise direction 48 about second pivot axis 26 to assume the stroller-retaining position.

Anchor controller 40 further includes third and fourth bias springs 63, 64. Third bias spring 63 is arranged to interconnect seat shell 20 and second front shell anchor 22 to cause second front shell anchor 22 to be biased to move in clockwise direction 48 about first pivot axis 24 to assume the base-retaining position. Fourth bias spring 64 is arranged to interconnect seat shell 20 and second rear anchor 32 to cause second rear anchor 32 to be biased to move in clockwise direction 48 about second pivot axis 26 to assume the stroller-retaining position.

First cable 51 is arranged to extend through first cable passageway 71 formed in seat shell 20. Second cable 52 is arranged to extend through second cable passageway 72 formed in seat shell 20. Third cable 53 is arranged to extend through third cable passageway 73 formed in seat shell 20. Fourth cable 54 is arranged to extend through fourth cable passageway 74 formed in seat shell 20.

The invention claimed is:

1. A child restraint system comprising
a base including a foundation adapted to set on a passenger seat in a vehicle and a base-anchor retainer coupled to the foundation in a fixed position relative to the foundation,
an infant carrier including a seat shell mounted on the base, a front shell anchor coupled to the seat shell to move about a first pivot axis relative to the seat shell between a base-retaining position in which the front shell anchor interconnects the seat shell to the base-anchor retainer and a base-releasing position in which the front shell anchor is spaced apart from the base-anchor retainer and a rear shell anchor spaced apart from the front shell anchor and coupled to the seat shell to move about a second pivot axis relative to the seat shell between a stroller-retaining position in which a stroller anchor-retainer interconnects the seat shell to a stroller and stroller-releasing position, and
an anchor controller configured to provide means for releasing either the front shell anchor from the base-anchor retainer or the rear shell anchor from the stroller anchor-retainer in response to an actuation force so that the infant carrier is freed to move away from the base or away from the stroller.

2. The child restraint system of claim 1, wherein the anchor controller is coupled to the seat shell to move back and forth relative to the seat shell between a locked position in which the front shell anchor is in the base-retaining position and the rear shell anchor is in the stroller-retaining position and an unlocked position in which the front shell anchor is in the base-releasing position and the rear shell anchor is in the stroller-releasing position.

3. The child restraint system of claim 2, wherein the anchor controller includes a release handle, a first cable, and a second cable, the first cable is arranged to interconnect the release handle and the front shell anchor to cause the front shell anchor to pivot about the first pivot axis in a counter-clockwise direction from the base-retaining position to the base-releasing position in response to movement of the release handle in a rearward direction away from the seat shell, and the second cable is arranged to interconnect the release handle and the rear shell anchor to cause the rear shell anchor to pivot about the second pivot axis in the counter-clockwise direction from the stroller-retaining position to the stroller-releasing position in response to movement of the release handle in the rearward direction.

4. The child restraint system of claim 2, wherein the infant carrier further comprises a carrying handle coupled to the seat shell, the carrying handle is pivotably coupled to the seat shell and movable between a vertical position and a horizontal position.

5. The child restraint system of claim 1, wherein the anchor controller includes a release handle, a first cable, and a second cable, the first cable is arranged to interconnect the release handle and the front shell anchor to cause the front shell anchor to pivot about the first pivot axis in a counter-clockwise direction from the base-retaining position to the base-releasing position in response to movement of the release handle in a rearward direction away from the seat shell, and the second cable is arranged to interconnect the release handle and the rear shell anchor to cause the rear shell anchor to pivot about the second pivot axis in the counter-clockwise direction from the stroller-retaining position to the stroller-releasing position in response to movement of the release handle in the rearward direction.

6. The child restraint system of claim 1, wherein the first pivot axis is spaced apart from and generally parallel to the second pivot axis.

7. The child restraint system of claim 1, further comprising a stroller frame including a rolling base and a stroller-anchor retainer coupled to the rolling base in a fixed position relative to the rolling base and the rear shell anchor interconnects the seat shell and the stroller-anchor retainer when the rear shell anchor is in the stroller-retaining position.

8. The child restraint system of claim 7, wherein the anchor controller is coupled to the seat shell to move back and forth relative to the seat shell between a locked position in which the front shell anchor is in the base-retaining position and the rear shell anchor is in the stroller-retaining position and an unlocked position in which the front shell anchor is in the base-releasing position and the rear shell anchor is in the stroller-releasing position.

9. The child restraint system of claim 1, wherein the anchor controller includes a release handle, a first cable, and a second cable, the first cable is arranged to interconnect the release handle and the front shell anchor to cause the front shell anchor to pivot about the first pivot axis in a counter-clockwise direction from the base-retaining position to the base-releasing position in response to movement of the release handle in a rearward direction away from the seat shell, and the second cable is arranged to interconnect the release handle and the rear shell anchor to cause the rear shell anchor to pivot about the second pivot axis in the counter-clockwise direction from the stroller-retaining position to the stroller-releasing position in response to movement of the release handle in the rearward direction.

10. The child restraint system of claim 9, wherein the front shell anchor is spaced-apart longitudinally from the rear shell anchor and rear shell anchor is located between the front shell anchor and the release handle.

11. The child restraint system of claim 9, wherein the first cable is arranged to extend through a first cable passageway formed in the seat shell and the second cable is arranged to extend through a second cable passageway formed in the seat shell.

12. The child restraint system of claim 9, wherein the anchor controller further includes first and second bias springs, the first bias spring is arranged to interconnect the seat shell and the front shell anchor to cause the front shell anchor to be biased to move in a clockwise direction about the first pivot axis to assume the base-retaining position.

13. The child restraint system of claim 12, wherein the second bias spring is arranged to interconnect the seat shell and the rear shell anchor to cause the rear shell anchor to be biased to move in the clockwise direction about the second pivot axis to assume the stroller-retaining position.

14. The child restraint system of claim 13, wherein the actuation force is applied to the release handle to cause the release handle to move in the rearward direction away from the seat shell to overcome a first bias force provided by the first bias spring and the first cable is pulled into tension to transmit the actuation force applied to the release handle to the front shell anchor.

15. The child restraint system of claim 14, wherein the second cable is pulled into tension to transmit the actuation force applied to the release handle to the rear shell anchor.

16. The child restraint system of claim 15, wherein the first and the second cables do not transmit force when compressed.

17. The child restraint system of claim 1, wherein the anchor controller includes a release handle, a first cable, and a second cable, the first cable is arranged to directly couple the release handle and the front shell anchor to cause the front shell anchor to pivot about the first pivot axis from the base-retaining position to the base-releasing position in response to movement of the release handle in a rearward direction away from the seat shell, the second cable is arranged to directly couple the release handle and the rear shell anchor to cause the rear shell anchor to pivot about the second pivot axis from the stroller-retaining position to the stroller-releasing position in response to movement of the release handle in the rearward direction, the first cable is not coupled to the rear shell anchor, and the second cable is not coupled to the front shell anchor.

18. A child restraint system comprising
a base including a foundation adapted to set on a passenger seat in a vehicle and a base-anchor retainer coupled to the foundation in a fixed position relative to the foundation,
an infant carrier including a seat shell mounted on the base, first and second front shell anchors coupled to the seat shell to move about a first pivot axis relative to the seat shell between a base-retaining position in which the front shell anchors interconnect the seat shell to the base-anchor retainer and a base-releasing position in which the front shell anchors are spaced apart from the base-anchor retainer, and first and second rear shell anchors spaced apart from the front shell anchors and coupled to the seat shell to move about a second pivot axis relative to the seat shell between a stroller-retaining position and stroller-releasing position, and an anchor controller coupled to the seat shell to move back and forth relative to the seat shell between a locked position in which the front shell anchors are in the base-retaining position and the rear shell anchors are in the stroller-retaining position and an unlocked position in which the front shell anchors are in the base-releasing position and the rear shell anchors are in the stroller-releasing position, and wherein the anchor controller includes a release handle and first, second, third, and fourth cables, and the first cable interconnects the release handle and the first front shell anchor to cause the first front shell anchor to pivot about the first pivot axis in a counter-clockwise direction from the base-retaining position to the base-releasing position in response to movement of the release handle in a rearward direction away from the seat shell, and the second cable interconnects the release handle and the first rear shell anchor to cause the first rear shell anchor to pivot about the second pivot axis in the counter-clockwise direction from the stroller-retaining position to the stroller-releasing position in response to movement of the release handle in the rearward direction.

19. The child restraint system of claim 18, wherein the front shell anchors are spaced-apart longitudinally from the rear shell anchors to locate the rear shell anchors between the release handle and the front shell anchors.

20. The child restraint system of claim 19, wherein the first front shell anchor is spaced-apart laterally from the second front shell anchor.

21. The child restraint system of claim 20, wherein the first rear shell anchor is spaced-apart laterally from the second rear shell anchor.

22. The child restraint system of claim 18, wherein the third cable is arranged to interconnect the release handle and the second front shell anchor to cause the second front shell anchor to pivot about the first pivot axis in the counter-clockwise direction from the base-retaining position to the base-releasing position in response to movement of the release handle in the rearward direction.

23. The child restraint system of claim 22, wherein the fourth cable is arranged to interconnect the release handle and the second rear shell anchor to cause the second rear anchor to pivot about the second pivot axis in the counter-clockwise direction from the base-retaining position to the base-releasing position in response to movement of the release handle in the rearward direction.

24. The child restraint system of claim 23, wherein the first and the second cables do not transmit a compressive force.

25. The child restraint system of claim 22, wherein the anchor controller further includes first and second bias springs and the first bias spring is arranged to interconnect the seat shell and the first front shell anchor to cause the first front shell anchor to be biased to move in a clockwise direction about the first pivot axis to assume the base-retaining position.

26. The child restraint system of claim 25, wherein the second bias spring is arranged to interconnect the seat shell and the first rear shell anchor to cause the first rear shell anchor to be biased to move in the clockwise direction about the second pivot axis to assume the stroller-retaining position.

27. A child restraint system comprising
a base including a foundation adapted to set on a passenger seat in a vehicle and a base-anchor retainer coupled to the foundation in a fixed position relative to the foundation,
an infant carrier including a seat shell mounted on the base, first and second front shell anchors coupled to the seat shell to move about a first pivot axis relative to the seat shell between a base-retaining position in which the front shell anchors interconnect the seat shell to the base-anchor retainer and a base-releasing position in which the front shell anchors are spaced apart from the base-anchor retainer, and first and second rear shell anchors spaced apart from the front shell anchors and coupled to the seat shell to move about a second pivot axis relative to the seat shell between a stroller-retaining position and stroller-releasing position, and
an anchor controller coupled to the seat shell to move back and forth relative to the seat shell between a locked position in which the front shell anchors are in the base-retaining position and the rear shell anchors are in the stroller-retaining position and an unlocked position in which the front shell anchors are in the base-releasing position and the rear shell anchors are in the stroller-releasing position, and wherein the anchor controller includes a release handle and first, second, third, and fourth cables, and the first cable interconnects the release handle and the first front shell anchor to cause the first front shell anchor to pivot about the first pivot axis in a counter-clockwise direction from the base-retaining position to the base-releasing position in response to movement of the release handle in a rearward direction away from the seat shell, and the second cable interconnects the release handle and the first rear shell anchor to cause the first rear shell anchor to pivot about the second pivot axis in the counter-clockwise direction from the stroller-retaining position to the stroller-releasing position in response to movement of the release handle in the rearward direction,
wherein the third cable is arranged to interconnect the release handle and the second front shell anchor to cause the second front shell anchor to pivot about the first pivot axis in the counter-clockwise direction from the base-retaining position to the base-releasing position in response to movement of the release handle in the rearward direction,
wherein the anchor controller further includes first and second bias springs and the first bias spring is arranged to interconnect the seat shell and the first front shell anchor to cause the first front shell anchor to be biased to move in a clockwise direction about the first pivot axis to assume the base-retaining position,
wherein the second bias spring is arranged to interconnect the seat shell and the first rear shell anchor to cause the first rear shell anchor to be biased to move in the clockwise direction about the second pivot axis to assume the stroller-retaining position, and
wherein the anchor controller further includes third and fourth bias springs and the third bias spring is arranged to interconnect the seat shell and the second front shell anchor to cause the second front shell anchor to be biased to move in the clockwise direction about the first pivot axis to assume the base-retaining position.

28. The child restraint system of claim 27, wherein the fourth bias spring is arranged to interconnect the seat shell and the second rear anchor to cause the second rear anchor to be biased to move in the clockwise direction about the second pivot axis to assume the stroller-retaining position.

29. The child restraint system of claim 25, wherein an actuation force is applied to the release handle to cause the release handle to move in the rearward direction away from the seat shell to overcome a first bias force provided by the first bias spring and the first cable is pulled into tension to transmit the actuation force applied to the release handle to the first front shell anchor.

30. The child restraint system of claim 29, wherein the second cable is pulled into tension to transmit the actuation force applied to the release handle to the first rear shell anchor.

31. The child restraint system of claim 18, wherein the first cable is arranged to extend through a first cable passageway formed in the seat shell, the second cable is arranged to extend through a second cable passageway formed in the seat shell, the third cable is arranged to extend through a third cable passageway formed in the seat shell, and the fourth cable is arranged to extend through a fourth cable passageway formed in the seat shell.

32. The child restraint system of claim 18, wherein the infant carrier further comprises a carrying handle coupled to the seat shell, the carrying handle is pivotably coupled to the seat shell and movable between a vertical position and a horizontal position.

33. The child restraint of claim 18, wherein the first cable is not coupled to the first rear shell anchor, and the second cable is not coupled to the first front shell anchor.

34. A child restraint system comprising
a base including a foundation adapted to set on a passenger seat in a vehicle and a base-anchor retainer coupled to the foundation in a fixed position relative to the foundation,
an infant carrier including a seat shell mounted on the base, a first shell anchor coupled to the seat shell to move about a first pivot axis relative to the seat shell between a base-retaining position in which the first shell anchor interconnects the seat shell to the base-anchor retainer and a base-releasing position in which the first shell anchor is spaced apart from the base-anchor retainer, and a second shell anchor spaced apart from the first shell anchor and coupled to the seat shell to move about a second pivot axis relative to the seat shell between a stroller-retaining position in which a stroller anchor-retainer interconnects the seat shell to a stroller and stroller-releasing position, and
an anchor controller configured to provide means for releasing either the first shell anchor from the base-anchor retainer or the second shell anchor from the stroller anchor-retainer in response to an actuation force so that the infant carrier is freed to move away from the base or away from the stroller.

* * * * *